July 19, 1932. J. D. KOOYENGA 1,867,669
TRACTOR
Filed March 15, 1929 3 Sheets-Sheet 3
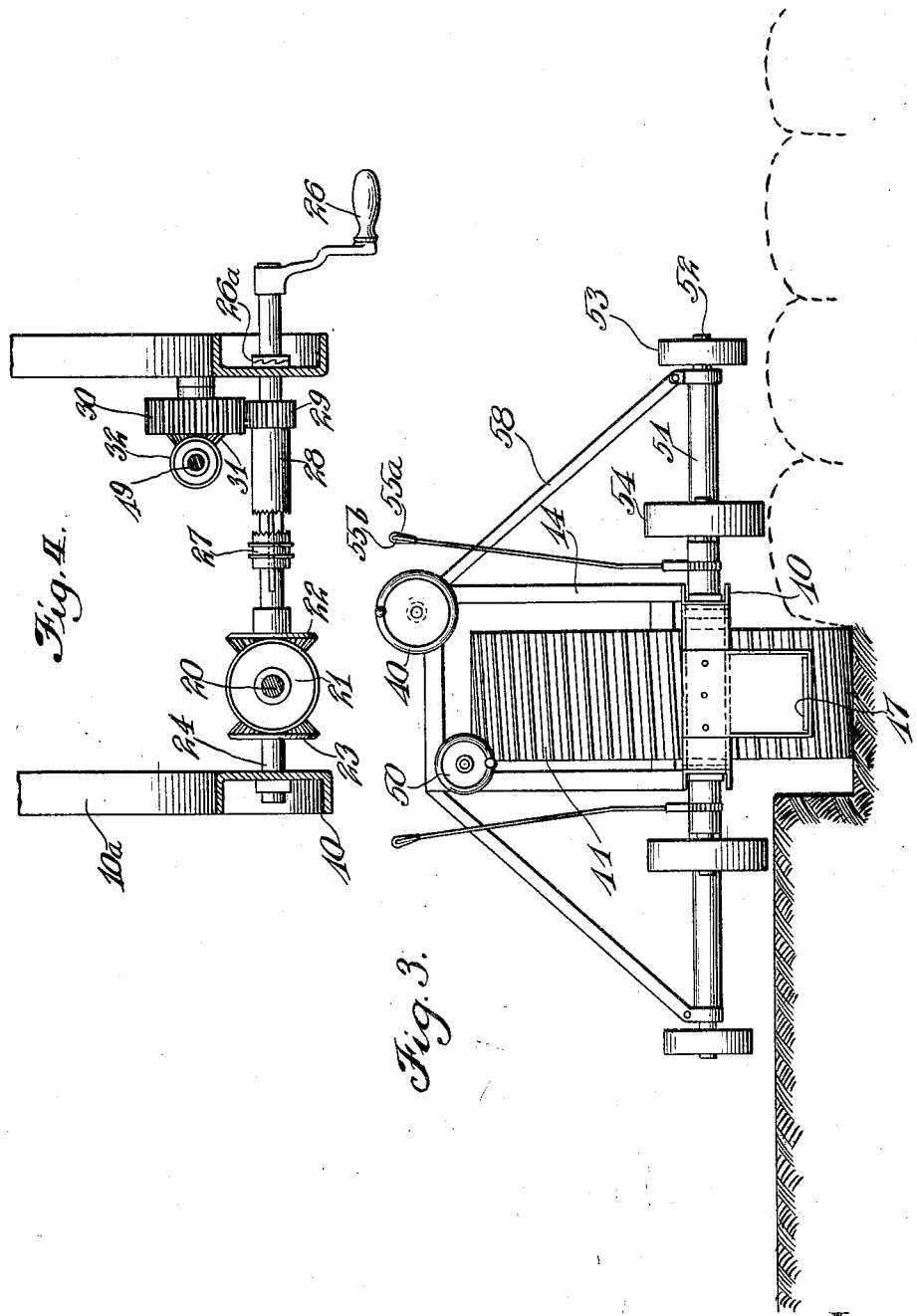
Inventor
Jake D. Kooyenga.
By Stevens and Batchelor
Attys.

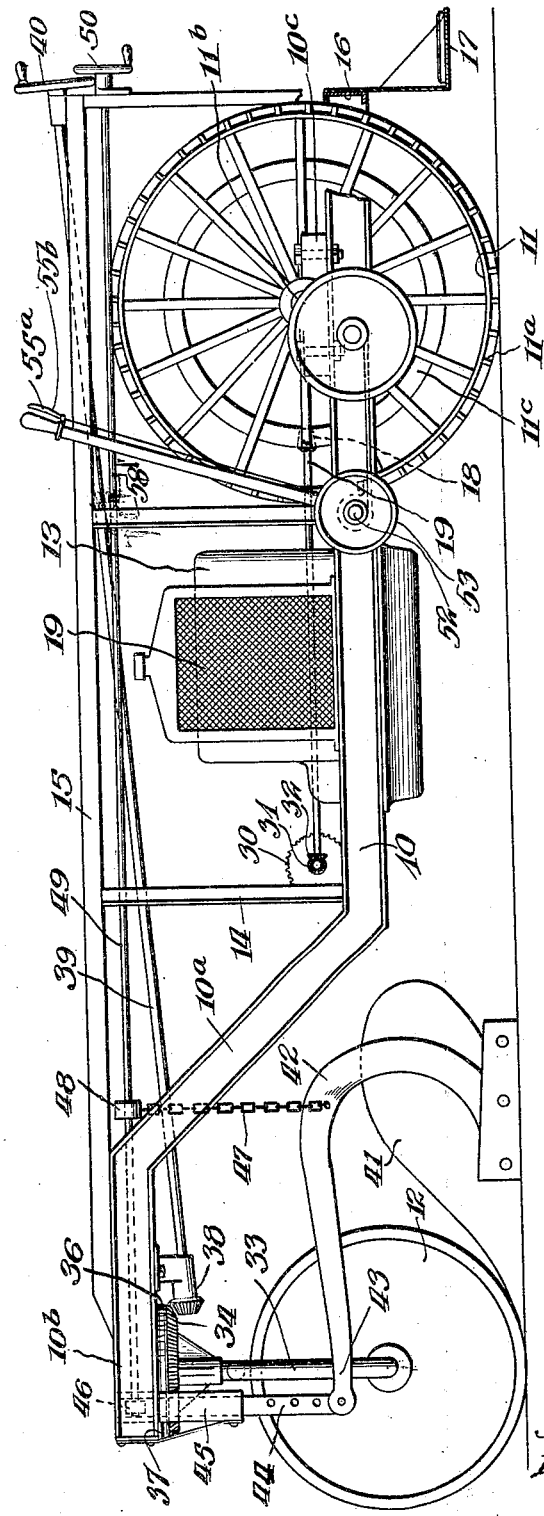

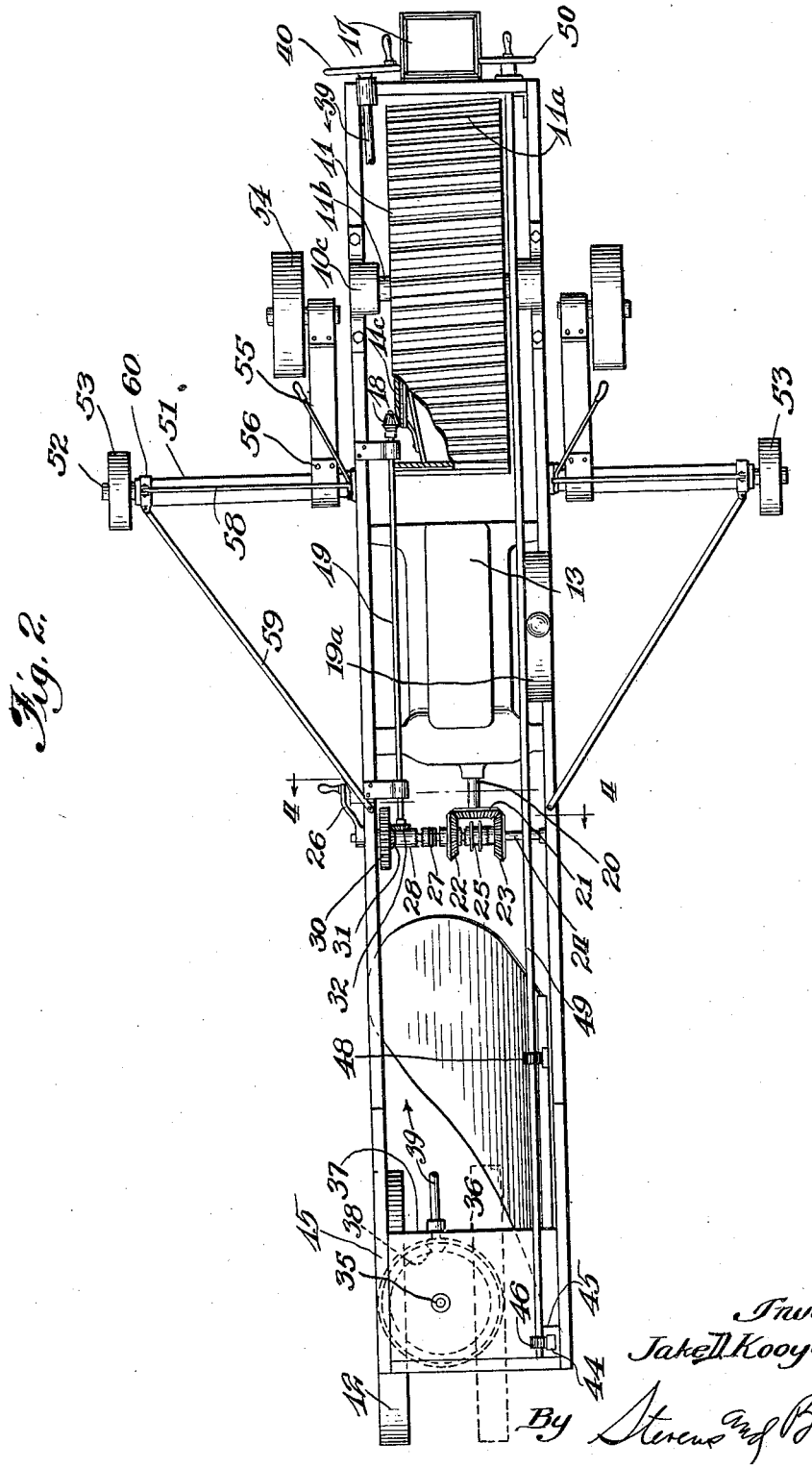

Patented July 19, 1932

1,867,669

UNITED STATES PATENT OFFICE

JAKE D. KOOYENGA, OF THORNTON, ILLINOIS

TRACTOR

Application filed March 15, 1929. Serial No. 347,240.

My invention relates to tractors, and more particularly to the lighter variety of tractors as used for truck gardening, and my main object is to provide a novel tractor which will operate in small beds, without riding on plowed or unplowed ground.

A further object of the invention is to design the same with its steering and driving wheels substantially in tandem fashion, eliminating the necessity of such wheels on the side or sides.

An additional object of the invention is to locate the steering wheel for travel alongside the course taken by the driving wheel, so that on a given plowing trip the steering wheel will ride in the ditch made on the previous trip, using the margin of the ditch as a guide.

A further object of the invention is to dispose the pivot of the steering wheel laterally of the vehicle center, and design the wheel to be swung for use in a central position when desired.

A still further object of the invention is to build the novel tractor as a self-contained unit of narrow gauge, making the vehicle portable and easily handled.

Another object of the invention is to equip the novel tractor with a set of balancing wheels, to aid it in maintaining equilibrium, and also to serve as safeguards in case the tractor suffers a dangerous tilt in a lateral direction.

A significant object of the invention is to provide the novel tractor with a set of auxiliary ground wheels to steady the motion of the vehicle.

A final but nevertheless important object of the invention is to construct the novel tractor from few and simple parts of a rugged nature, and of such a design as to be adaptable for plowing, harrowing and various other agricultural implements.

With the above objects in view and any others that suggest themselves from the specification and claims to follow, a better understanding of the invention may be had by reference to the accompanying drawings, in which—

Figure 1 is a side elevation of the novel tractor;

Fig. 2 is a plan view, partly broken away;

Fig. 3 is a rear view; and

Fig. 4 is a detail section on the line 4—4 of Figure 2.

With tractors of the four or three wheeled types, it is inevitable that at least the wheel or wheels at one or the other side of the tractor must run over plowed or unplowed ground, inflicting damage to the same. I have found that a tractor of the single or tandem type, when properly balanced and safeguarded, can overcome the above difficulty, especially one used for light work, such as truck gardening, being of a size sufficiently small for handling by one attendant. Also, by staggering the front, or steering wheel from the back, or drive wheel such steering wheel can travel in the furrow of a previous plow cut and so utilize the drive wheel and plow to the side limits of the plowed bed.

Referring specifically to the drawings, it will be apparent that the tractor I have in mind is generally composed of a frame 10, a drive wheel 11 in the rear portion of the same, a steering wheel 12 at the front and an engine 13 in the center. The frame 10 comprises parallel channel bars, with outwardly facing hollows, the main portions of these bars being horizontal. Toward the front, the frame bars rise obliquely as indicated at 10a, and terminate horizontally at an elevated point, as indicated at 10b. Upon the frame bars 10 are angle posts 14 upon which are supported top angle bars 15 whose hollows face inwardly. The assembly of the bars and posts is secured by any suitable means, preferably by welding to make for simplicity. The frame bars 10 are joined across the rear by an inwardly facing channel bar 16, this bar carrying a step 17 upon which the operator may ride.

The drive wheel 11 is suitably ribbed upon its periphery as indicated at 11a, or otherwise fitted with ground engaging elements for traction purposes; and it is journaled with its shaft 11b in suitable bearing blocks 10c. The wheel is of ample width to support the machine in upright position when the wheel is on flat ground, and it is fitted on one side of its spokes with a ring bevel-gear 11c, with which a bevel pinion 18 carried by a longitudinal shaft 19 meshes in order to deliver power to the wheel.

The engine 13 may be of any suitable type, but it should preferably be a small size four cylinder gasoline type, with the radiator 19 on the side as shown. I have not shown any engine equipment or controls as these are within the skill of any tractor engineer and may be designed in the best manner to suit the situation. I have, however, chosen a specific means for the delivery of the power from the engine to the drive wheel, as will be described in the next section.

Referring more particularly to Figures 2 and 4, it will be noted that the engine shaft 20 extends forwardly to receive a bevel-gear 21 which is in mesh with bevel-gears 22, 23 on the sides and mounted on a jack shaft 24. The gears 21, 22 and 23 together with a clutch and shifter unit 25 therebetween make up what is commonly known as a forward- and-reverse gear. Thus, the gears 22 and 23 are loose on the shaft 24, but the shifter 25 is keyed thereon, so that motion in one or the other direction may be transmitted from the gear 21 to the shaft 24, on the well known principle of this type of gearing. From the gearing just described the shaft extends to receive bearings in the frame bars 10, one end of the shaft extends beyond the frame to receive a crank handle 26 with a suitable ratchet connection 26a to serve for cranking the engine, in the manner that cranks are usually applied to the shafts of automobile engines. Within the frame, the shaft receives in keyed connection a slidable clutch shifter 27, which is adapted to make engagement with the clutch face of a shaft sleeve 28 whose remote end is formed as a spur pinion 29. Above the latter, a spur gear 30 is mounted to mesh with the pinion, the gear 30 having a bevel pinion 31 formed on its inner side. The pinion 31 is caused to mesh with a companion pinion 32 on the forward end of the shaft 19, completing the drive to the wheel 11 at a low gear ratio. It is thus seen that when the clutch shifter 27 is retracted, as shown, the engine will have no connection with the pinion 29, and can therefore be cranked without hindrance from the vehicle running gear. I have not shown any controls for the clutch shifters 25 and 27, as these are of no patentable import and may be designed as best suits the purpose. Relative to the steering wheel 12, it will be noted that the same is carried at the front end of the machine by a hanger 33. This hanger depends from a horizontal bevel gear 34, carried by gusset plate 37 secured on the underside of the frame section 10b. The hanger 33 is thus rotatable to turn the wheel in any direction, and the control for this motion is in the form of a bevel pinion 38 meshing with the bevel gear 34 and carried on a long operating rod 39 which extends to the rear and is fitted with a hand wheel 40. The position of the steering wheel in a going course is such that it is practically in alinement with one side of the drive wheel. Thus, when the tractor is equipped with a plow 41—whose beam is shown at 42—I can position the steering wheel 12 in the ditch of the course next previously plowed and so enable it to lead the tractor without riding on plowed or unplowed ground. The ditch thus serves as a guide to determine the course of the drive wheel and plow on each trip until the side limits of the plowed bed are reached. Also, by swinging the steering wheel around to the position indicated by dotted lines in Fig. 2, it may be given a position medially of the drive wheel, which is of advantage when the tractor is used for cultivating, harrowing, seeding, etc., the plow being replaceable by an implement for any of these purposes.

It is my intention to adjust the plow as to height by lifting the front end of its beam at one rate and the rear portion at a faster rate, so that the said portion may clear the ground more quickly and thus get a shorter start when re-applied. This is done by fitting the beam with a vertical gear rack draw-bar 44 adapted to travel in a sheath 45 and to be operated by a spur pinion 46. The rear portion of the beam 42 is connected by a chain 47 to a pulley 48. The pinion 46 for the pulley 48 is at the same height and carried by an operating rod 49 which extends rearwardly to receive a hand wheel 50. With the pulley 48 of a larger diameter than the pinion 46, it will be obvious that the rate of pull on the rear portion of the plow will be more rapid than on the front portion, and likewise when the plow is dropped.

While the vehicle may sustain a fair degree of equilibrium from the nature of its drive wheel 11 and the low position of its power plant, points in its travel may cause it to tilt dangerously at one time or another. To counteract such an eventuality, I have extended the frame laterally with tubes 51 and forming bearings for shafts 52, each shaft extending from the outer end of the corresponding tube 51 to receive a small wheel 53. Thus, in the event of a tilt in either direction, one of the wheels 53 will strike the ground which owing to the depth of the tractor wheels in a furrow will be higher and therefore more readily accessible to the corresponding wheel 53, stopping the tilt before it becomes extreme. Ordinarily, however, the vehicle is guided in the general course of its travel by guide wheels 54 along the sides. These wheels are carried by spring blades 55 attached at 56 upon the tubes 51, the attachment being, however, variable along the course of the tubes, so as to space the wheels 54 from the corresponding side of the tractor frame as desired. Thus, the wheels 54 may be equally close to the sides of the tractor or at different distances therefrom, consistent with the nature of the ground on which they ride. The last mentioned qualification also applies to the height of the wheels 54, which may be adjusted at the same point, since the tubes 51 are round. My reason for making the supports 55 for the wheels 54 spring blades is to enable the wheels to readily clear stones or irregularities along their path of travel without imparting jolts to the vehicle or causing it to assumed an unsteady motion. As it may be of advantage for the operator to control the height of the wheels 54 at will, the blades 55 are fitted with upstanding levers 55a which assume positions alongside the vehicle frame and may be stationed at different positions by grip-locks 55b or other suitable hand-controlled means.

To properly support the tubes, I apply inclined braces 58 from the top of the tractor frame and similar braces 59 from the sides thereof, the outer ends of these braces being connected to a suitable collar 60, loosely applied near the outer ends of the tubes. Thus, the tubes are capable of being turned as the levers 55a are swung in one or the other direction, imparting the rising or falling motion to the wheel supports 55.

A tractor is thus had which is generally of a narrow dimension and tread, is suitable for plowing without damage to the ground from riding, can serve for other agricultural operations, and is safe from upsetting.

I claim:

1. A tandem tractor comprising an elongated frame having an elevated front frame section and a relatively low rear frame section, a steering wheel journaled on the front frame section, and a relatively wide traction wheel of substantially the same width as the frame journaled above the rear frame section.

2. A tandem tractor comprising an elongated rectangular frame having an elevated front frame section and a relatively low rear frame section, a steering wheel journaled in the front frame section, manually operated means for steering said wheel by an operator positioned at the end of the rear frame section, a traction wheel journaled in the rear frame section and of substantially the same width as said frame section, and a power plant positioned on the rear frame section adjacent to the traction wheel and in front thereof and connected therewith, whereby the weight of the power plant and operator on the rear frame section normally maintains the tractor in equilibrium.

3. A tandem traction comprising a rectangular frame having an elevated front frame portion, a steering wheel mounted therein with an offset pivot so that it may be disposed either medially or laterally of the line of travel, a downwardly inclined frame section, and a rear frame section, a traction wheel journaled above the rear frame section and at the end of said section, a motor adjacent the traction wheel and in front thereof, and a drive shaft between said motor and the traction wheel.

In testimony whereof I affix my signature.

JAKE D. KOOYENGA.